United States Patent [19]
Sieminski et al.

[11] Patent Number: 6,049,141
[45] Date of Patent: Apr. 11, 2000

[54] DEVICE AND A METHOD ALLOWING MULTIPLE BATTERIES TO SHARE A COMMON LOAD

[75] Inventors: Dennis P. Sieminski, Atlanta, Ga.; Daniel J. Schmieder, Los Angeles, Calif.

[73] Assignee: AER Energy Resources, Inc., Smyrna, Ga.

[21] Appl. No.: 09/079,700

[22] Filed: May 15, 1998

Related U.S. Application Data

[60] Provisional application No. 60/047,260, May 21, 1997.

[51] Int. Cl.[7] ........................................... H02J 1/10
[52] U.S. Cl. ................................... 307/44; 307/66
[58] Field of Search ..................... 307/43, 44, 64, 307/65, 66, 80, 85, 86, 87, 150; 320/111, 112, 134, 140, 149, 150, 124

[56] References Cited

U.S. PATENT DOCUMENTS

| | | | |
|---|---|---|---|
| 3,387,194 | 6/1968 | Banks | 318/139 |
| 3,473,963 | 10/1969 | Sanderson | 136/86 |
| 3,883,368 | 5/1975 | Kordesch et al. | 136/86 |
| 3,956,638 | 5/1976 | Ahrens et al. | 307/48 |
| 4,017,779 | 4/1977 | McDonald et al. | 320/15 |
| 4,081,738 | 3/1978 | Roller | 320/7 |
| 4,139,846 | 2/1979 | Conforti | 340/636 |
| 4,310,606 | 1/1982 | Maida | 429/93 |
| 4,318,092 | 3/1982 | Cowles et al. | 340/636 |
| 4,612,492 | 9/1986 | Burk | 320/3 |
| 4,633,412 | 12/1986 | Ebert, Jr. et al. | 364/493 |
| 4,673,826 | 6/1987 | Masson | 307/66 |
| 4,729,930 | 3/1988 | Beal et al. | 429/13 |
| 4,816,736 | 3/1989 | Dougherty et al. | 320/17 |
| 4,913,983 | 4/1990 | Cheiky | 429/13 |
| 4,929,931 | 5/1990 | McCuen | 340/636 |
| 4,949,028 | 8/1990 | Brune | 320/6 |
| 5,015,546 | 5/1991 | Dulaney et al. | 429/99 |
| 5,047,961 | 9/1991 | Simonsen | 364/550 |
| 5,063,340 | 11/1991 | Kalenowsky | 320/1 |
| 5,218,285 | 6/1993 | Carlton et al. | 320/15 |

(List continued on next page.)

OTHER PUBLICATIONS

"Maxim 12V or Adjustable, High–Efficiency, Low $1_Q$-Step–Up DC–DC Controller", Evaluation Manual, Jul. 1995, pp. 1–16.

Primary Examiner—Jeffrey Gaffin
Assistant Examiner—Peter Zura
Attorney, Agent, or Firm—Jones & Askew LLP

[57] ABSTRACT

The present invention provides a battery system, a device, and a method to allow multiple batteries with varying capacities and power capabilities to drive a common load. Furthermore, the present invention provides a method for adjusting the output current of one or more of the batteries driving a common load to maximize the operational time of the load. The level of the current being supplied by the battery unit is monitored and compared to a desired current level. Upon detecting a change in the level of the current, the output voltage of one or more of the battery systems is modified to return the level of the battery current to the desired current level. This is accomplished by detecting the battery current (31) with a detector (66) and transforming the change in the battery current into an error signal (76) by comparing a voltage, representative of the battery current (31) with a reference value (72). The error signal (76) is then converted into an output adjust signal (62) by an adjuster (78). The output adjust signal (62) indicates whether the level of the battery current (31) needs to be adjusted and whether the adjustment should result in increasing or decreasing the battery current (31).

14 Claims, 4 Drawing Sheets

U.S. PATENT DOCUMENTS

| | | | |
|---|---|---|---|
| 5,223,351 | 6/1993 | Wruck | 429/9 |
| 5,225,761 | 7/1993 | Albright | 320/15 |
| 5,258,239 | 11/1993 | Kobayashi | 429/27 |
| 5,270,946 | 12/1993 | Shibasaki et al. | 364/492 |
| 5,304,431 | 4/1994 | Schumm, Jr. | 429/27 |
| 5,316,868 | 5/1994 | Dougherty et al. | 429/9 |
| 5,343,137 | 8/1994 | Kitaoka et al. | 320/13 |
| 5,422,558 | 6/1995 | Stewart | 320/7 |
| 5,438,248 | 8/1995 | Hyuck | 320/15 |
| 5,485,073 | 1/1996 | Kasashima et al. | 320/15 |
| 5,644,209 | 7/1997 | Chabbert et al. | 320/15 |
| 5,656,915 | 8/1997 | Eaves | 320/6 |
| 5,684,384 | 11/1997 | Barkat et al. | 307/66 |
| 5,691,074 | 11/1997 | Pedicini | 429/27 |
| 5,721,064 | 2/1998 | Pedicini et al. | 429/27 |
| 5,721,481 | 2/1998 | Narita et al. | 320/111 |

DEVICE AND A METHOD ALLOWING MULTIPLE BATTERIES TO SHARE A COMMON LOAD

CROSS-REFERENCE TO RELATED APPLICATION

This application claims the benefit of provisional application Ser. No. 60/047,260 filed May 21, 1997.

TECHNICAL FIELD

This invention relates generally to controlling the output current of multiple batteries sharing a common load, and more specifically, to a control circuit for maintaining the output current of multiple batteries sharing a common load at a constant level by monitoring the current being supplied and adjusting the output current of one or more batteries sharing the common load if the output current drifts from the constant value.

BACKGROUND OF THE INVENTION

Keeping in step with the growth of the computing and communications industries has been the ever increasing need for affordable and convenient portable electronic devices, such as mobile telephones, computers, fax machines, games, lighting, audio equipment, medical equipment and the like. In answering this need, one facet of the industry has focused much attention on developing smaller, lighter, less expensive, and energy efficient electronic devices. However, power demands have dramatically increased as new features are introduced in portable devices. For instance, typical portable computers include color displays, internal modems and large banks of memory. In parallel with the development of portable devices, another facet of the industry has focused on developing smaller, lighter, less expensive, and energy efficient batteries. As these two facets of industry develop, the increasing longevity of the operational use of various portable electronic devices while optimizing the size and weight remains a major goal. The present invention is directed toward taking the next step in this technological revolution.

Today, users of portable electronic devices commonly purchase several batteries that are compatible with the device. Users carry these batteries with them and change the batteries out as they become discharged. Although this technique allows users to be mobile for longer periods of time, there are several disadvantages associated with this practice. The cost of the additional batteries can be quite significant. In addition, the process of maintaining a supply of charged batteries and carrying them around can be very burdensome. The weight of the additional batteries is a problem for someone who needs a high degree of mobility. Users must change batteries at inopportune moments, such as the middle of a conversation on a portable telephone, downloading information with a portable computer, or while operating a video camera in the middle of their son's turn at bat. Thus, there is a need for a portable energy source that is inexpensive, light, small, efficient, and minimizes the interruptions to the operation of portable electronic devices by increasing the longevity of the operational use.

One possible technique to limit the interruption of operation is by placing multiple batteries in parallel. This technique extends the useful operating time of the electronic device, however, the length of time ("RUNTIME") that the parallel batteries can source the electronic device is a function of the characteristics of the batteries. RUNTIME is defined as the period of time that multiple batteries can continually drive a load without having to be recharged. As an example, assume that two batteries are connected in parallel to drive a load. If the wattage required by the load is WLOAD, then the upper threshold of the RUNTIME can be determined as:

$$\text{RUNTIME} = (V_{B1}C_{B1} + V_{B2}C_{B2})/\text{WLOAD},$$

where $V_{B1}$ is the voltage and $C_{B1}$ is capacity in amp-hours of one battery and $V_{B2}$ is the voltage and $C_{B2}$ is the capacity in amp-hours of the other battery. By adding additional batteries in parallel, the RUNTIME can be extended even further:

$$\text{RUNTIME} = (V_{B1}C_{B1} + V_{B2}C_{B2} \ldots + V_{Bn}C_{Bn})/\text{WLOAD}.$$

Simply connecting multiple batteries in parallel has several limitations. To actually achieve the upper threshold RUNTIME, each of the batteries must be able to individually drive the load. For instance, if two batteries are connected in parallel but only one of the batteries, a dominant battery, is able to individually drive the load, the RUNTIME is limited by the characteristics of the dominant battery. Thus, there is a need for a system and a method for allowing multiple batteries with varying capacities and power capabilities to drive a common load while distributing the demand placed on each of the batteries in accordance with its capacity and power capability. This technique will allow a battery with a higher capacity and low power and a battery with a lower capacity and high power to commonly drive a load and achieve the upper threshold RUNTIME. Further, the combination of two different electrochemical systems may provide a hybrid with optimal performance dimensions generally not found in the same electrochemical package.

SUMMARY OF THE INVENTION

The present invention seeks to provide: a battery system in which multiple batteries with varying capacities and power capabilities, can drive a common load while distributing the demands placed on each of the batteries in accordance with its capacity and/or power capability; a battery system that allows multiple batteries, connected in parallel, to efficiently drive a load and achieve a maximum RUNTIME; and a circuit that can monitor the current supplied by multiple batteries and generate an output adjust signal that can be used to control the output current of one or more of the batteries.

The present invention achieves these objects in one aspect, by providing a battery system that can be connected, in parallel, with an electronic device or an electronic device and another battery. The battery system operates by monitoring the current of the battery system and detecting when the current fluctuates from a desired level. In another aspect, the present invention achieves these objectives by providing a device and a method for monitoring the current of multiple batteries, detecting fluctuations in the current, and providing an output adjust signal that can be used to adjust the output current of one or more of the batteries.

More particularly described, the present invention provides a battery system, functionally connectable in parallel with a main battery, such as an OEM battery, and a load device. The battery system augments the current supplied by the main battery. The battery system includes a supplemental battery, having at least one battery unit, a current sensor and feedback voltage regulator. The current sensor detects the level of the augmented current supplied to the load, generates an output adjustment signal as a function of the level of the augmented current, and provides the output adjustment signal to the output voltage control of the battery unit. The output voltage circuit is used to adjust the output current of the battery unit, thereby augmenting the level of the current.

In one embodiment, the current sensor includes a detector, a comparator, and an adjuster. The detector is electrically coupled to a conductor carrying the battery current and has a load signal output. The detector determines the level of the load current by converting the load current into a voltage or sensing the magnetic field surrounding the conductor to obtain a load signal representative of the level of the load current. The load signal is then provided to the load signal output.

The comparator is functionally connected to the load signal output of the detector and includes an error signal output. The comparator receives the load signal from the detector, compares the load signal to at least one reference signal, generates an error signal representative of the results of the comparison, and provides the error signal to the error signal output.

The adjuster is functionally connected to the error signal output of the comparator. The adjuster receives the error signal from the comparator and converts the error signal into an output adjust signal compatible with the output control circuit of the battery unit.

The present invention also provides a method for regulating the output current of a plurality of battery units connected to a load. The level of the output current of the plurality of battery units is monitored to detect when the output current either drops below a first threshold value or rises above a second threshold value. In one embodiment, the first and second threshold values can be the same. The output current of at least one of the plurality of battery units is then adjusted to either increase or decrease the level of the current.

Other objects, features, and advantages of the present invention will become apparent upon reading the following detailed description of the embodiments of the invention, when taken in conjunction with the accompanying drawings and appended claims.

DETAILED DESCRIPTION

The present invention provides a system and a method for multiple batteries with varying capacities and power capabilities to commonly drive a load and achieve the maximum RUNTIME and optimal performance dimensions such as high energy density and high power density. Generally described, one aspect of the present invention includes a battery system that can be connected, in parallel, with an electronic device or an electronic device and another battery. The battery system operates by monitoring the battery current supplied and detecting when the battery current fluctuates from a desired level. When the load current decreases due to the discharging of one or more of the batteries, the output current of the battery system can be increased to compensate for the lack of current. Likewise, when the load current increases, the output current of the battery system can be decreased. Another aspect of the present invention includes a device and a method for monitoring the load current of an electronic device being powered by multiple batteries, detecting fluctuations in the load current, and providing an output adjust signal that can be used to adjust the output voltage of one or more of the batteries.

For convenience, the term "battery" is used in this application to refer to a power source including one or more electrochemical cells. The term "battery unit" is used in this application to refer to a single battery or a combination of multiple batteries.

Figure 1:
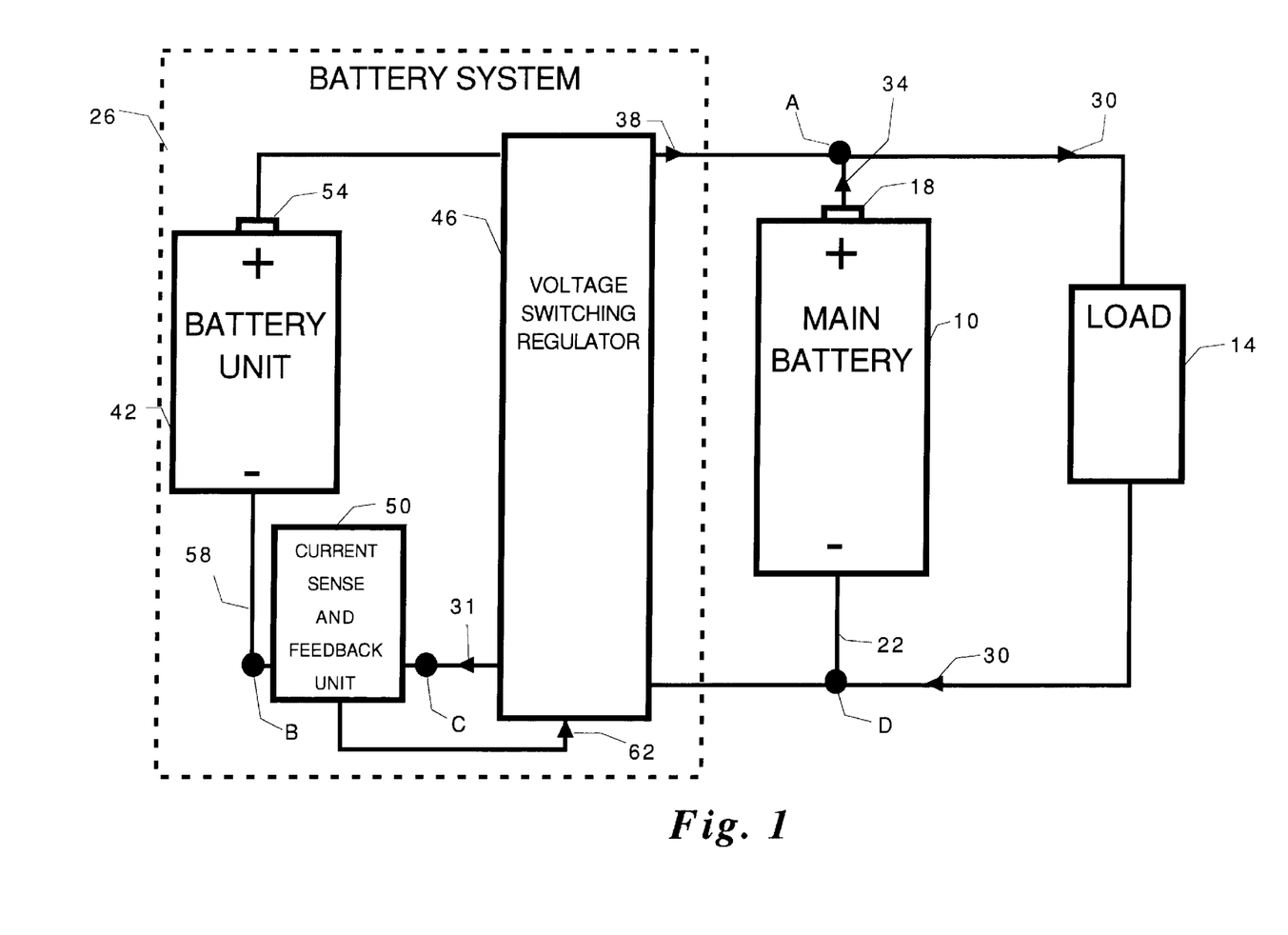
FIG. 1 is a block diagram of a battery powered electronic device providing a suitable environment for incorporating the battery system aspect of the present invention.

Referring now in detail to the drawings, in which like numerals, labels and characters refer to like parts throughout the several views, FIG. 1 is a block diagram of a battery powered electronic device providing a suitable environment for incorporating the battery system aspect of the present invention. In this configuration, a main battery 10 and a load 14 are functionally connected in parallel. The main battery 10 has a positive terminal 18 having a voltage potential that is more positive than a negative terminal 22. A battery system 26 is connected in parallel to the main battery 10 at points A and D. A load current 30 being supplied to the load 14 is the sum of the current 34 being supplied by the main battery 10 and the current 38 being supplied by the battery system 26.

The battery system 26 includes a battery unit 42, an output control circuit 46, and a current sense and feedback control system 50. The combination of the battery unit 42 and the output control circuit 46 is also referred to as a supplemental battery. The battery unit 42 may be a single battery with one or more cells or multiple batteries connected in series, parallel, or a combination of both. Regardless of the configuration, the battery unit 42 has a positive terminal 54 having a voltage potential that is more positive than a negative terminal 58.

The output control circuit 46 is electrically coupled to the battery unit 42 and is operative to control the output current of the battery unit 42. The output control circuit 46 receives an output adjust signal 62. In response to the output adjust signal 62, the output control circuit 46 adjusts the output voltage to the load and hence the current 38.

The constant current adapter 50 functionally connects points B and C in such a manner that the battery current 31 passes through the constant current adapter 50 between points B and C. In operation, the constant current adapter 50 detects the level of the battery current 31 and generates the output adjust signal 62 as a function of the battery current 31. Thus, the battery system 26 operates to control the battery current 31 by (a) detecting the level of the battery current 31, (b) generating an output adjust signal 62, (c) and adjusting the output voltage of the battery system 26.

As an example, assume the battery system 26 is designed to maintain a battery current 31 at a constant value of 1.15 Amps. The battery system 26 monitors the battery current 31 passing between points B and C. If the battery current 31 drops below 1.15 Amps, the output adjust signal 62 can be used to indicate that additional current is required. In response to the output adjust signal 62, the output control circuit 46 can increase the output voltage of the battery system 26, thereby increasing the battery current 31, and hence the load current 38. Likewise, if the battery current 31 passing between points B and C rises above 1.15 Amps, the output adjust signal 62 can be used to indicate that less current is required. In response to the output adjust signal 62, the output control circuit 46 can decrease the output voltage of the battery system 26.

Figure 2:
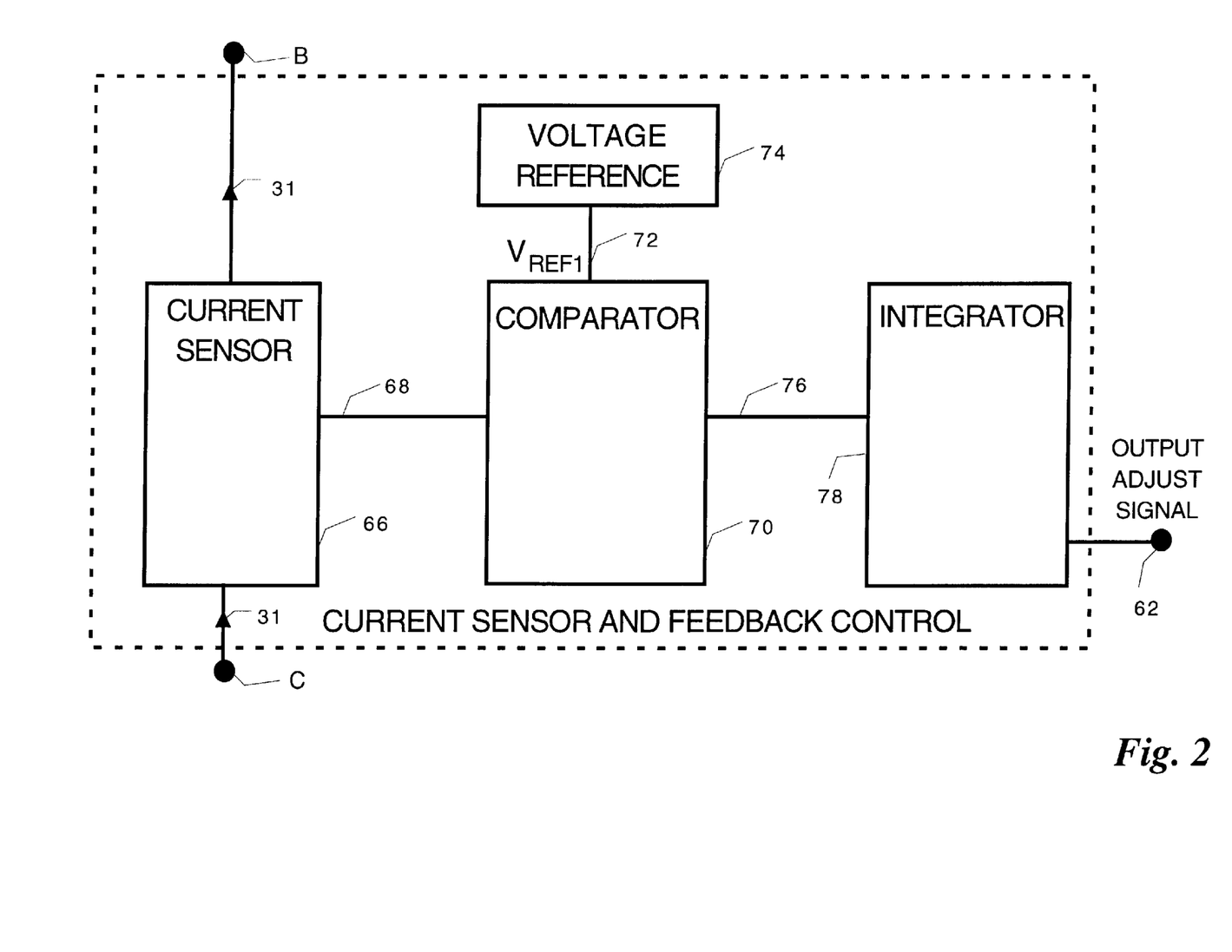
FIG. 2 is a block diagram of an exemplary embodiment of the constant current adapter aspect of the present invention.

FIG. 2 is a block diagram of an exemplary embodiment of the current sense and feedback control aspect of the present invention. A current sensor 66 is electrically coupled to the electrical path between points B and C for detecting the level of the battery current 31, and generating a load signal 68 as a function of the battery current 31.

A comparator 70 receives the load signal 68 from the detector 66 and a reference signal $V_{REF1}$ 72 from a voltage reference 74. The comparator then generates an error signal 76 representing the difference between the received signals. In the exemplary embodiment, the load signal 68 is a voltage level proportional to the level of the battery current 31. $V_{REF1}$ 72 is a voltage level used as a threshold value. A load signal 68 that is more positive than $V_{REF1}$ 72, indicates that the battery current 31 should be reduced. A load signal 68 that is more negative than $V_{REF1}$ 72, indicates that the battery current 31 should be increased. Thus, the presence of the error signal 76 can be used to indicate that the battery current 31 needs to be adjusted, and the magnitude of the error signal 76 can be used to indicate whether the battery current 31 needs to be increased or decreased. Those skilled in the art will recognize that the comparator 70 can be implemented in a variety of ways using varying technologies.

The integrator 78, receives the error signal 76 and generates an output adjust signal 62 for adjusting the output voltage of a battery system. In general, the integrator 78 converts the error signal 76 into a signal compatible for adjusting the battery system. In some configurations, it is conceivable that the error signal 76, in and of itself, will be sufficient for this purpose. In this case, the comparator 70 and the integrator 78 are a single functional unit.

Figure 3:
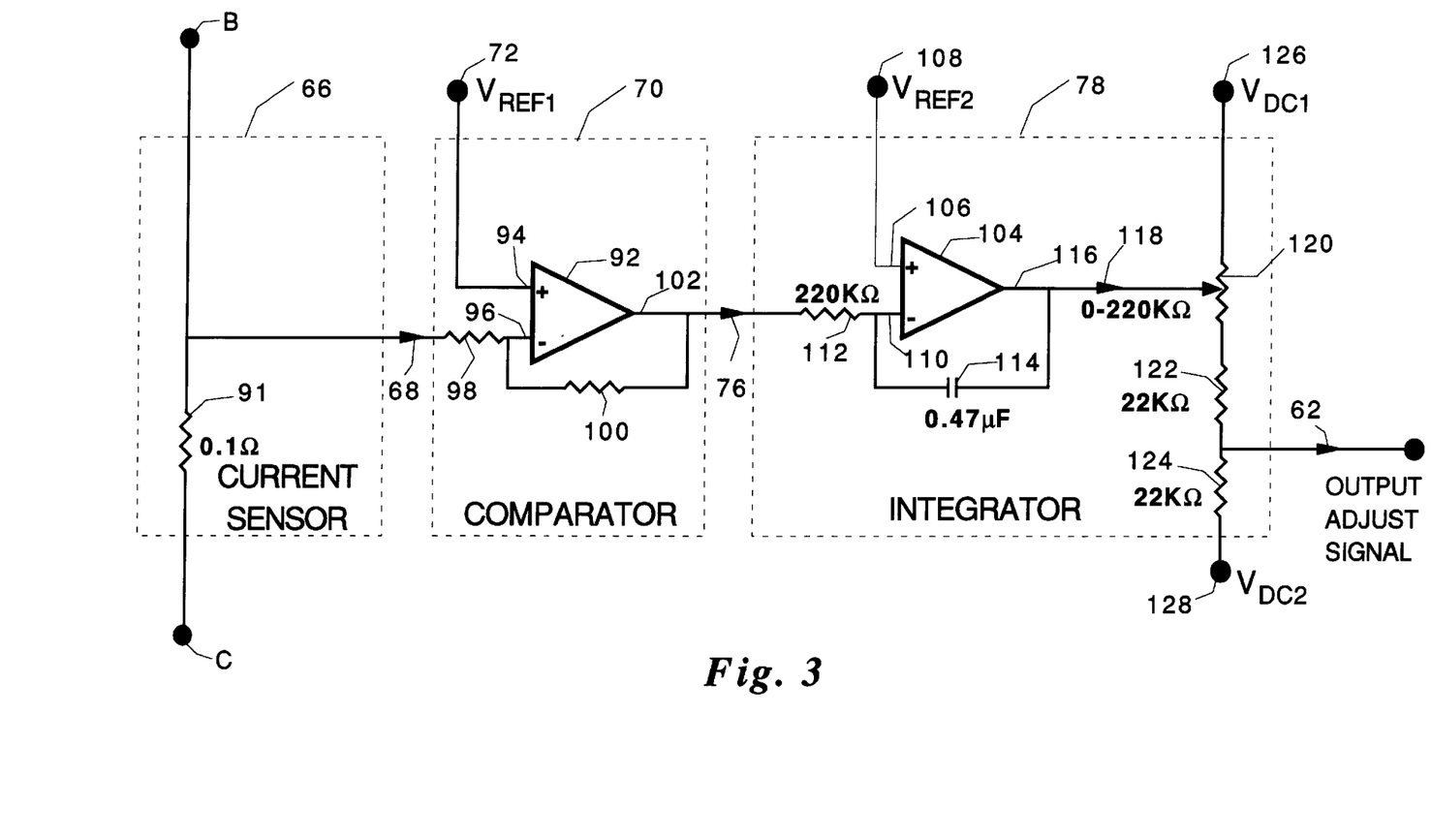
FIG. 3 is a schematic diagram of an exemplary embodiment of the constant current adapter constructed in accordance with an exemplary embodiment of the present invention.

FIG. 3 is a schematic diagram of an embodiment of the current sense and feedback control system constructed in accordance with an exemplary embodiment of the present invention. In the exemplary embodiment, the current sensor includes a resistor 91 connected between point B and C. The resistor is shown as having a resistance of 0.1 Ω, however, other values can also be used. To prevent any degradation in the performance of the system, the value of the resistance should be negligible in comparison to the resistance of the load. As the battery current 31 passes through the resistor 91, a voltage is developed across the resistor 91. The voltage developed across the resistor 91 is provided as an output of the current sensor 66 and load signal 68. It should be noted that the current sensor 66 can employ a variety of technologies for detecting the battery current 31. The use of a resistor, interposed between points B and C is simply one possible embodiment. In other embodiments, devices such as current transformers, Hall-effect devices, or the like, can be used to sense the magnetic field around the electrical path between points B and C, and generate the load signal 68 as a function of the battery current 31.

The comparator 70 of the exemplary embodiment includes a voltage comparator 92. The non-inverting input 94 of the voltage comparator 92 receives a voltage reference $V_{REF1}$ 72. The inverting input 96 of the voltage comparator 92 is functionally connected to the output of the detector 66 through an input resistor 98 for receiving load signal 68. One terminal of a feedback resistor 100 is functionally connected between the input resistor 98 and the inverting input 96 of the voltage comparator 92. The other terminal of the feedback resistor 100 is connected to the output 102 of the voltage comparator 92. Thus, the voltage comparator 92 is configured to operate as an inverting amplifier having a gain defined by the input resistor 98 and feedback resistor 100. Preferably, the gain is on the order of 50 to 150.

During operation, the voltage comparator 92 compares the voltage level of the load signal 68 with the voltage reference $V_{REF1}$ 72. The voltage reference $V_{REF1}$ 72 is equated to the value that the load signal 68 would be at if the load current 30 is at a desired level. When the battery current 31 drops below the desired level, the voltage of the load signal 68 decreases below the value of $V_{REF1}$ 72, and the voltage comparator 92 generates an error signal 76 having a high voltage level. When the battery current 31 rises above the desired level, the voltage of the load signal 68 increases above the value of $V_{REF1}$ 72, and the voltage comparator 92 generates an error signal 76 having a low voltage level. By changing the value of the voltage reference $V_{REF1}$ 72, the current adapter can be used to detect various current levels. If $V_{REF1}$ 72 is a fixed value, the current adapter operates as a constant current adapter.

The use of an inverting amplifier is only one possible embodiment for the comparator 92. Other embodiments may be used to generate error signals having different characteristics. One embodiment may generate an error signal that is logically inverted from error signal 76 generated by the inverting amplifier. Yet other embodiments may generate an error signal at varying frequencies. In any case, the comparator 70 functions to generate an error signal 76 indicating that the battery current 31 needs to be adjusted, and whether the battery current 31 needs to be increased or decreased.

The integrator 78 of the exemplary embodiment includes a voltage comparator 104. The non-inverting input 106 of the voltage comparator 104 receives a voltage reference $V_{REF2}$ 108. The inverting input 110 of the voltage comparator 104 is functionally connected to the output 102 of the voltage comparator 92 through an input resistor 112. The inverting input 110 receives the error signal 76 through the input resistor 112. One terminal of a capacitor 114 is connected between the inverting input 110 of the voltage comparator 104 and the input resistor 112. The other terminal of the capacitor 114 is connected to the output 116 of the voltage comparator 104. Thus, the voltage comparator 104 is configure to operate as an integrator having a time constant defined by the input resistor 112 and the capacitor 114. In the preferred embodiment, the input resistor 112 has a resistance of 220KΩ and the capacitor 114 has a capacitance of 0.47 µF thereby establishing a time constant of 0.1 seconds.

During operation, the voltage comparator 104 compares the voltage level of the error signal 76 with the voltage reference $V_{REF2}$ 108. The voltage reference $V_{REF2}$ 108 is equated to a value that is less positive than the highest voltage level obtained by the error signal 76 and more positive than the lowest voltage level obtained by the error signal 76. In response to comparing the error signal 76 and the voltage reference $V_{REF2}$ 108, a resistance control signal 118 is developed at the output 116 of the comparator 104. When the error signal 76 is at the high voltage level, the resistance control signal 118 decays at a rate established by the input resistor 112 and the capacitor 114. When the error signal 76 is at the low voltage level, the resistance control signal 118 rises at the same rate.

The integrator 78 of the exemplary embodiment includes a resistor network consisting of a variable resistor 120, and two fixed resistors 122 and 124 all connected in series. One terminal of the variable resistor 120 is connected to a DC voltage source $V_{DC1}$ 126. The other terminal of the variable resistor 120 is connected to one terminal of the fixed resistor 122. The other terminal of the fixed resistor 122 is connected to one terminal of the fixed resistor 124. The other terminal of the fixed resistor 124 is connected to a DC voltage source $V_{DC2}$ 128. The variable resistor 120 is electrically coupled to the output of the voltage comparator 104.

During operation, the resistance of the variable resistor 120 varies as a function of the resistance control signal 118. In the exemplary embodiment, the resistance of the variable resistor 120 is inversely proportional to the voltage level of the resistance control signal 118. The output adjust signal 62 is available at the common junction between the fixed resistor 122 and the fixed resistor 124. As the resistance control signal 118 rises, the resistance of the variable resistor 120 decreases, thereby increasing the voltage of the output adjust signal 62. As the resistance control signal 118 decays, the resistance of the variable resistor 120 increases, thereby decreasing the voltage of the output adjust signal 62. The output adjust signal 62 can then be used to control the output current of a battery unit.

In the preferred embodiment, the variable resistor 120 has a resistance ranging from 0–220kΩ and the fixed resistors 122 and 124 each have a resistance of 22kΩ. The output adjust signal 62 is connected to the adjust input of the controllable battery unit. The output adjust signal 62 generally is functionally connected to the feedback input of an adjustable, step-up DC—DC converter such as the MAX1771 chip available from Maxim Integrated Products.

The various reference voltages and DC voltage sources can be provided from a separate power source or be derived from the output of the battery unit. In the preferred embodiment, the DC voltage source $V_{DC1}$ 126 is obtained directly from the output of the battery unit and the DC voltage source $V_{DC2}$ 128 is ground. The voltage reference $V_{REF2}$ 108 is obtained by using a diode or similar device to clamp the voltage at 2.5 volts DC. The voltage reference $V_{REF1}$ 72 is obtained by using high precision resistors in a voltage divider network to divide the voltage reference $V_{REF2}$ 108 down to 0.13 volts DC.

Figure 4:
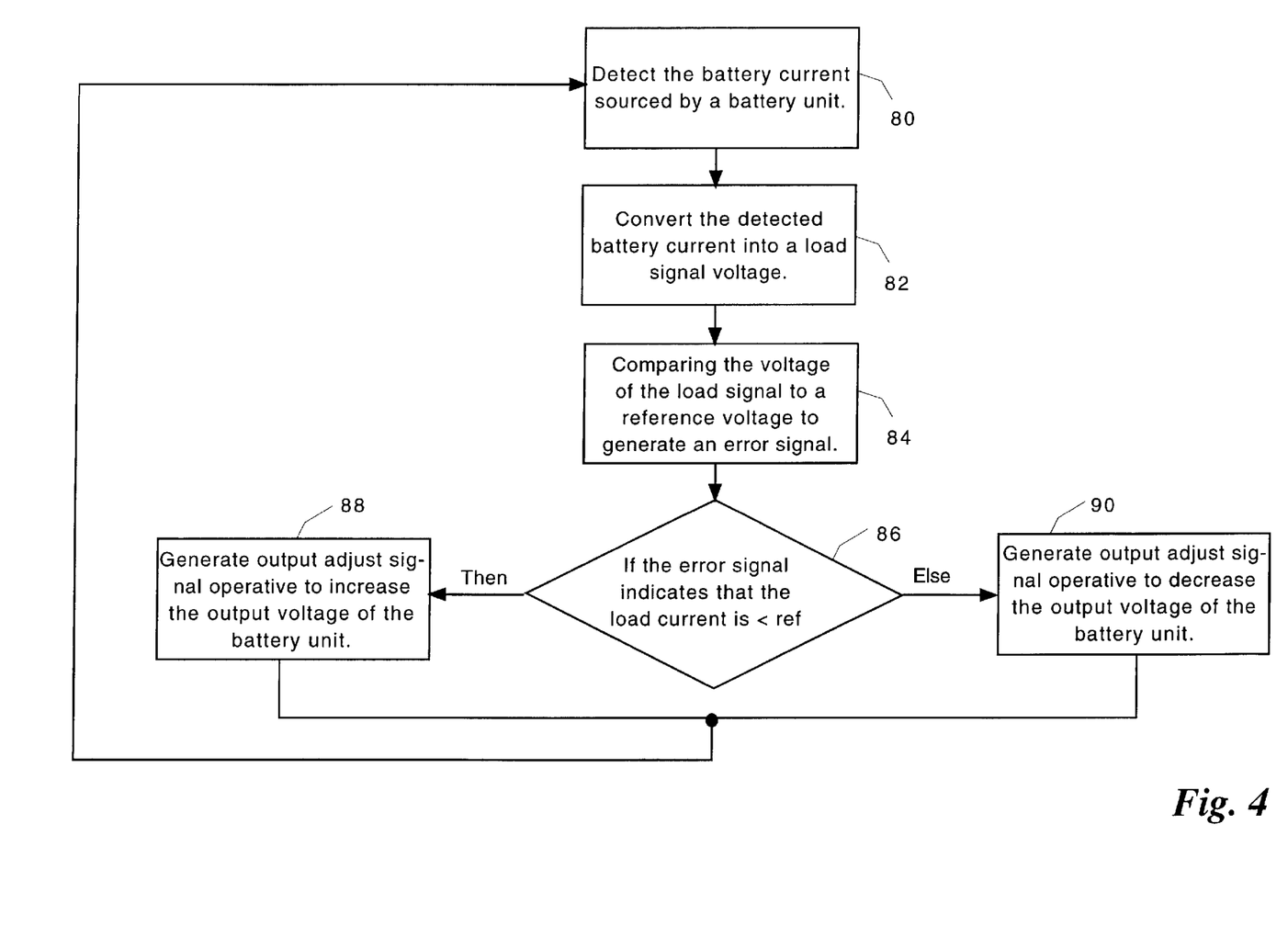
FIG. 4 is a flow diagram illustrating the steps involved in implementing various embodiments of the constant current adapter aspect of the present invention.

FIG. 4 is a flow diagram illustrating the steps involved in implementing various embodiments of the constant current adapter aspect of the present invention. Those skilled in the art will recognize that the constant current adapter can be implemented in various ways using a variety of technologies. Regardless of the particular method or technology employed, the constant current adapter should perform the steps or equivalent steps provided in FIG. 4. At step 80, the level of the battery current being sourced by a battery unit is detected. At step 82, the level of the detected current is converted into a voltage level for providing a load signal. The voltage level of the load signal can be either directly or inversely proportional to the battery current. At step 84, the voltage level of the load signal is compared to a reference voltage. The reference voltage is equated to the value that will be approximately equal to the voltage of the load signal when the battery current is at the desired level. Thus, when the voltage of the load signal is not equal to the reference voltage, the battery current requires adjustment. At step 86, the error signal is examined to determine the state of the battery current. If the error signal indicates that the battery current is too low, then processing continues at step 88. Otherwise, processing continues at step 90. At step 88, an output adjust signal is generated for increasing the output current of the battery unit. At step 90, an output adjust signal is generated for decreasing the output current of the battery unit. In either case, processing returns to step 80 and the entire process is repeated. In the preferred embodiment, if the battery current is equal to the desired current level, the output current of the battery unit will dither about the level necessary to maintain the desired current level. It should be apparent that some level of hysteresis could be employed to limit the amount of dithering that occurs.

In conclusion, the present invention provides a battery system and a method for allowing multiple batteries with varying capacities to drive a common load. Furthermore, the present invention provides a method for adjusting the output wattage or current of one or more of the multiple batteries to maximize the amount of time that the multiple batteries can drive the common load. The level of the current being supplied by the battery unit is monitored and compared to a desired level. Upon detecting a change in the level of the current, the output voltage of the battery system is modified in such a way as to return the level of current to the desired level. This is accomplished by transforming the change in the current into an output adjust signal. The output adjust signal conveys information that the current needs to be adjusted and whether the adjustment should result in increasing or decreasing the current.

While this invention has been described in detail with particular reference to embodiments thereof, it will be understood that variations and modifications can be effected within the spirit and scope of the invention as described herein before and as defined in the appended claims.

We claim:

1. A battery system, functionally connectable to a main battery and for augmenting the battery current supplied by the main battery to a load, comprising:

a supplemental battery, having a battery unit and an output control circuit, the battery unit having a different capacity or capability than the main battery the output control circuit having an output control input and being operative to adjust the level of the voltage supplied to the load in response to signals received on the output control input; and a current adapter, functionally connected to the main battery and the output control input of the supplemental battery, and operative to detect the battery current supplied to the load, generate an output adjust signal as a function of the current, and provide the output adjust signal to the output control input of the supplemental battery.

2. The battery system of claim 1, wherein the current adapter comprises:

a detector, electrically coupled to a conductor carrying the load current and having a load signal output, the current adapter being operative to detect the load current by using the detector to convert the level of the load current into a load signal, the load signal being representative of the level of the load current, and providing the load signal to the load signal output;

a comparator, functionally connected to the load signal output of the detector and having an error signal output, the comparator being operative to receive the load signal, compare the load signal to at least one reference signal, generate an error signal representative of the results of the comparison, and provide the error signal to the error signal output; and an adjuster, functionally connected to the error signal output of the comparator, and the current adapter is operative to generate the output adjustment signal by receiving the error signal from the comparator and converting the error signal into the output adjust signal compatible with the output control circuit of the supplemental battery.

3. The battery system of claim 2, wherein the battery unit of the supplemental battery is functionally connectable in parallel to the main battery.

4. A method for regulating the combined power output of a battery unit having a main battery and a supplemental battery, the supplemental battery having a different capacity or capability than the main battery, comprising the steps of:

monitoring the current of the supplemental battery;

detecting when the level of the current in the supplemental battery drops below a first threshold value; and increasing the output voltage of the supplemental battery to at least the first threshold value.

5. The method of claim 4, further comprising the steps of:

detecting when the level of the monitored supplemental battery current rises above a second threshold value; and decreasing the output voltage of the supplemental battery to at least the second threshold value.

6. A device for providing an output adjust signal for regulating the combined output current of a plurality of battery units sharing a common load, comprising:

a detector, operative to detect the level of the output current from at least one of the plurality of battery units and in response, generate a load signal representative of the level of the output current;

a comparator, operative to compare the load signal to at least one reference signal, and in response, generate an error signal representative of the results of the comparison; and an adjuster, operative to receive the error signal and adjust the output voltage of at least one of the plurality of battery units to reduce the value of the error signal.

7. The device of claim 6, wherein the common load has a first and second terminal, and the detector comprises:

a current sensor, functionally connected to one of the terminals of the common load, and operative to detect the combined output current at that terminal; and a converting means, operative to convert the detected combined output current into the load signal, the load signal being proportional to the level of the detected combined output current.

8. The device of claim 6, wherein the common load and the plurality of batteries each have two terminals and are functionally connected to each other in parallel at the two terminals, and the detector comprises:

a first resistor having a first and second terminal, the first terminal of the resistor being functionally connected to a selected terminal of the common load, the second terminal of the first resistor being functionally connected to the terminal of the plurality of battery units functionally connected to the selected terminal; and whereby the load signal is the voltage developed across the first resistor in response to the combined output current passing through the first resistor.

9. The device of claim 8, wherein the first resistor has a resistance that is negligible compared to the resistance of the common load.

10. The device of claim 6, wherein the load signal and the first reference signal each have a voltage level, and the comparator comprises a first voltage comparator having:

an inverting input functionally connected to the detector for receiving the load signal;

a non-inverting input for receiving the first reference signal; and a comparison output for providing the error signal, the error signal being at a first voltage level when the load signal is more negative than the first reference signal and at a second voltage level when the load signal is more positive than the first reference signal.

11. The circuit of claim 10, wherein the adjuster comprises an integrator circuit and a variable resistor network, the integrator circuit comprising:

an input resistor, a second voltage comparator, and a feedback capacitor, the input resistor having a first and second terminal, the first terminal being functionally connected to the comparison output of the first voltage comparator, the second voltage comparator having an inverting input, a non-inverting input, and a comparison output, the inverting input of the second voltage comparator being functionally connected to the second terminal of the input resistor, the non-inverting input of the second voltage comparator being connected to a second reference signal, the second reference signal having a voltage potential that is more negative than the first voltage level of the error signal and more positive than the second voltage level of the error signal, and a comparison output for providing a resistance control signal, the feedback capacitor having a first and second terminal, the first terminal of the feedback capacitor being connected to the second terminal of the input resistor and the inverting input of the second voltage comparator, the second terminal of the feedback capacitor being connected to the comparison output of the second comparator, the input resistor having a resistance and the feedback capacitor having a capacitance such that they define a time constant so that when the error signal is at a first voltage level, the resistance control signal decays in accordance with the time constant and when the error signal is at a second voltage level, the resistance control signal rises in accordance with the time constant; and the variable resistor network comprising:

a variable resistor having a first, second and adjustment terminal, the first terminal being functionally connected to a first voltage source, the adjustment terminal being functionally connected to the output of the second comparator, and in response to receiving the resistance control signal, being responsive to vary the resistance as an inverse function of the resistance control signal; and a fixed resistor having a first and second terminal, the first terminal being functionally connected to the second terminal of the variable resistor, the second terminal being connected to a second voltage source, and providing the output adjust signal that is inversely proportional to the resistance of the variable resistor.

12. The device of claim 6, wherein the load signal and each reference signal have a voltage level, the comparator comprises a first voltage comparator operative to compare the voltage level of the load signal with the voltage level of at least one reference signal and responsive to generate the error signal at a first voltage level when the load signal is more positive than the reference signal and the error signal at a second voltage level when the load signal is more negative than the reference signal.

13. The device of claim 12, wherein the adjuster comprises:

an integrator, operative to receive the error signal generated by the comparator and responsive to converting the error signal into a resistance control voltage that gradually rises when the error signal is at the first voltage level and a gradually decays when the error signal is at the second voltage level;

a voltage controlled resistor having a first and second terminal and being electrically coupled to the integrator for receiving and responding to the resistance control voltage, the first terminal of the voltage controlled resistor being connected to a first voltage source and having a resistance that is inversely proportional to the resistance control voltage; and a second resistor, having a first terminal connected to the second terminal of the voltage controlled resistor and a second terminal connected a second voltage source, and the output adjust signal being available at the second terminal of the variable resistor and the first terminal of the second resistor.

14. A method for providing an output adjust control signal to adjust automatically the output power of at least one of a plurality of battery units connected across a common load, wherein the at least one of the plurality of battery units has a different capacity or capability than the remaining plurality of battery units, comprising the steps of:

detecting the current being supplied by the battery unit, converting the battery current into a detected voltage, and comparing the detected voltage to a reference voltage;

generating an upward output adjust signal for increasing the output power of the at least one of the plurality of battery units when the detected voltage is more negative than the reference signal; and generating a downward adjustment signal for decreasing the output power of the at least one of the plurality of battery units when the detected voltage is more positive than the reference signal.

* * * * *